(12) United States Patent
Jeong et al.

(10) Patent No.: US 8,093,795 B2
(45) Date of Patent: Jan. 10, 2012

(54) FIELD EMISSION BACK LIGHT UNIT, CATHODE STRUCTURE THEREOF AND METHOD FOR FABRICATING THE SAME

(75) Inventors: Jin Woo Jeong, Daejeon (KR); Yoon Ho Song, Daejeon (KR); Dae Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/739,190

(22) PCT Filed: Jun. 25, 2008

(86) PCT No.: PCT/KR2008/003634
§ 371 (c)(1),
(2), (4) Date: Apr. 22, 2010

(87) PCT Pub. No.: WO2009/078518
PCT Pub. Date: Jun. 25, 2009

(65) Prior Publication Data
US 2010/0225225 A1    Sep. 9, 2010

(30) Foreign Application Priority Data

Dec. 17, 2007  (KR) .......................... 10-2007-0132746

(51) Int. Cl.
*H01J 1/62* (2006.01)
(52) U.S. Cl. ..................... 313/495; 313/496; 313/309
(58) Field of Classification Search ............. 313/495, 313/496, 309, 336, 351
See application file for complete search history.

(56) References Cited

U.S. PATENT DOCUMENTS

| 7,352,123 | B2 | 4/2008 | Ahn et al. |
| 2005/0133779 | A1 | 6/2005 | Choi et al. |
| 2005/0145297 | A1 | 7/2005 | Chang |
| 2005/0258730 | A1 | 11/2005 | Lee et al. |
| 2006/0231837 | A1 | 10/2006 | Wuchse et al. |

FOREIGN PATENT DOCUMENTS

| CN | 1612284 A | 5/2005 |
| JP | 2003-217478 A | 7/2003 |
| KR | 10-2005-0110189 A | 11/2005 |
| KR | 10-2009-0026017 A | 3/2009 |
| WO | WO-01/84587 A2 | 11/2001 |
| WO | WO 2007/058502 A1 | 5/2007 |

*Primary Examiner* — Vip Patel
(74) *Attorney, Agent, or Firm* — Rabin & Berdo, P.C.

(57) ABSTRACT

Provided is a field emission device, and more particularly, a field emission back light unit which makes an interconnection connected with an external electrode simple and capable of local dimming. To this end, a cathode structure for the field emission back light unit includes a plurality of data electrodes formed on a cathode substrate and spaced apart from one another, an insulating layer formed on the data electrodes, and having exposure regions exposing the predetermined data electrodes, cathode electrodes formed on the insulating layer and electrically connected with the data electrodes through the exposure regions, and at least one field emitter formed on the cathode electrodes, wherein a cathode block is defined based on the cathode electrodes electrically isolated from one another, and brightness of each cathode block can be controlled according to current supplied through the data electrode.

10 Claims, 5 Drawing Sheets

(a)

(b)

(c)

(d)

FIELD EMISSION BACK LIGHT UNIT, CATHODE STRUCTURE THEREOF AND METHOD FOR FABRICATING THE SAME

TECHNICAL FIELD

The present invention relates to a field emission device, and more particularly, to a field emission back light unit which is capable of local dimming and a cathode structure employed therein.

BACKGROUND ART

Generally, flat panel displays may be classified into emissive displays and non-emissive displays.

The emissive displays include a plasma display panel (PDP) display and a field emission display (FED), and the non-emissive displays include a liquid crystal display (LCD).

While the LCD, a non-emissive display, has light weight and low power consumption, it cannot create an image by self-emission, but only by light entering from outside. Thus, the image created by the LCD cannot be observed in a dark place. To solve this problem, a back light unit is equipped at a back surface of the LCD.

Conventionally, as a back light unit, a cold cathode fluorescent lamp (CCFL), which is a linear light source, and a light emitting diode (LED), which is a spot light source, are mainly used.

However, such back light units are complicated and expensive, and consume a large amount of power according to reflection and transmission of light due to the light source disposed at a side thereof. Particularly, as the LCD becomes larger, uniform brightness becomes difficult to ensure.

For these reasons, in recent time, a field emission back light unit having a flat emission structure has been developed. Such a field emission back light unit consumes less power and exhibits relatively uniform brightness in a wide range of an emission region, compared to the conventional back light unit using a CCFL.

Generally, in a field emission-back light unit, a cathode substrate having a field emitter and an anode substrate having a phosphor are disposed to face and be spaced a specific distance apart from each other, and vacuum-packed. An electron emitted from the field emitter collides with the phosphor of the anode substrate, so that light is emitted by cathodoluminescence of the phosphor.

A structure of the conventional field emission back light unit will now be described with reference to FIG. 1.

FIG. 1 illustrates the field emission back light unit capable of local dimming, which has a metal gate substrate.

Referring to FIG. 1, the conventional field emission back light unit having the metal gate substrate includes a cathode substrate as a lower substrate 110, a plurality of cathode electrodes 112 formed on the lower substrate 110, a field emitter 114 formed on the plurality of cathode electrodes 112, an anode substrate as an upper substrate 120, an anode electrode 122 formed on the upper substrate 120, a phosphor layer 124 formed on the anode electrode 122, a metal gate substrate 132 and spacers 142 and 144.

When a specific amount of current is applied to the cathode electrode 112, the field emitter 114 emits an electron beam, which is radially propagated. As a result, the electron beam emitted from the field emitter 114 reaches a phosphor 124 corresponding to a pixel, and the phosphor 124 emits light.

Meanwhile, for partial control of brightness and a high contrast ratio, an amount of current applied to the plurality of cathode electrodes 112 is controlled. For precise local dimming, the number of cathode electrodes 112 has to be increased, which makes interconnections connected with an external electrode complicated.

Thus, a method for effectively performing local dimming without complicated interconnections connected with an external electrode is needed.

DISCLOSURE OF INVENTION

Technical Problem

The present invention is directed to a field emission back light unit having simple interconnections connected with an external electrode and capable of local dimming.

Other objects of the present invention will be understood with reference to following descriptions and exemplary embodiments of the present invention.

Technical Solution

One aspect of the present invention provides a cathode structure for a field emission back light unit including: a plurality of data electrodes formed on a cathode substrate and spaced apart from one another; an insulating layer formed on the data electrodes, and having exposure regions exposing the predetermined data electrodes; cathode electrodes formed on the insulating layer and electrically connected with the data electrodes through the exposure regions; and at least one field emitter formed on the cathode electrode, wherein a cathode block is defined based on the cathode electrodes electrically isolated from one another, and brightness of each cathode block can be controlled according to current supplied through the data electrode.

Another aspect of the present invention provides a method of fabricating a cathode structure for the field emission back light unit including: defining cathode blocks for controlling brightness by blocks on a transparent substrate; forming a plurality of data electrodes spaced apart from one another on the respective cathode blocks; forming an insulating layer having an exposure region exposing any one of the data electrodes formed on the respective cathode blocks; forming a plurality of cathode electrodes spaced apart from one another on the insulating layer, any one of the cathode electrodes being electrically connected with the data electrode through the exposure region; applying an emitter paste to the cathode electrode except a part of the insulating layer, in which the cathode electrode is not formed; and irradiating UV light on a bottom surface of the substrate and developing the substrate.

Still another aspect of the present invention provides a field emission back light unit including: an upper substrate and a lower substrate, which are spaced apart from and face each other; an anode electrode and a phosphor layer, which are formed on the upper substrate; a metal gate substrate disposed between the upper and lower substrates to induce electron emission from a field emitter, and having an opening to pass the emitted electron therethrough; a plurality of data electrodes spaced apart from one another on the lower substrate; an insulating layer formed on the data electrodes and having exposure regions exposing the predetermined data electrodes; cathode electrodes formed on the insulating layer and electrically connected with the data electrodes through the exposure regions; and at least one field emitter formed on the cathode electrode, wherein a cathode block is defined based on the cathode electrodes electrically isolated from one another, and brightness of the cathode block can be controlled according to current supplied through the data electrode.

Advantageous Effects

As described above, interconnections connected with an external electrode may be simply formed by a dual structure of a data electrode and an insulating layer.

MODE FOR THE INVENTION

In the following description, it is to be noted that a detailed description of the known function and configuration of the present invention will be omitted if it is deemed to obscure the subject matter of the present invention. The terms described below, as terms defined considering their functions in the present invention, can be different depending on a user or operator's intention, or a practice. Thus, the definition should be made on the basis of the contents throughout this specification.

A conventional field emission back light unit capable of local dimming used as a back light for a liquid crystal display partially controls brightness by changing current flowing into each of cathode electrodes formed on a cathode substrate, and for precise local dimming, the cathode electrode has to be made small and increased in number. However, as described above, according to the increased number of cathode electrodes, the number of interconnections to be connected with an external driver is also increased, and the interconnections are very difficult to be connected with the external driver within a limited space. To solve this problem, the present invention provides a device which is not limited to the number of unit blocks capable of local dimming and easily connects the external driver with an electrode.

Exemplary embodiments of the present invention will now be described with reference to accompanying drawings in detail.

Figure 1:
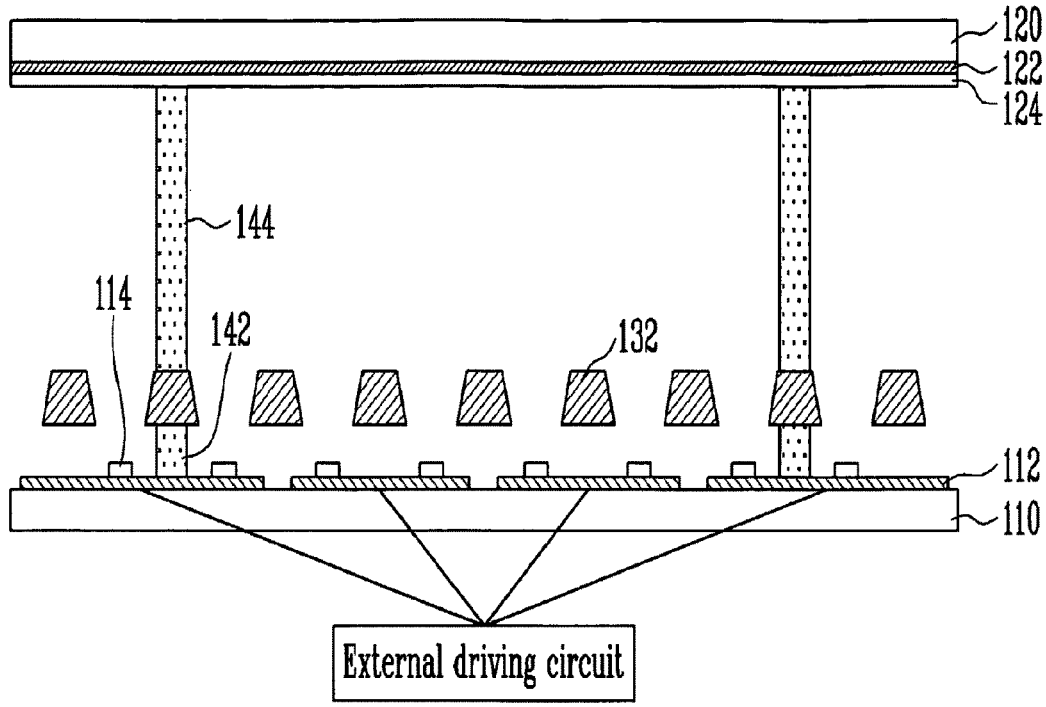
FIG. 1 illustrates a field emission back light unit capable of local dimming, which has a metal gate substrate.
Figure 2:
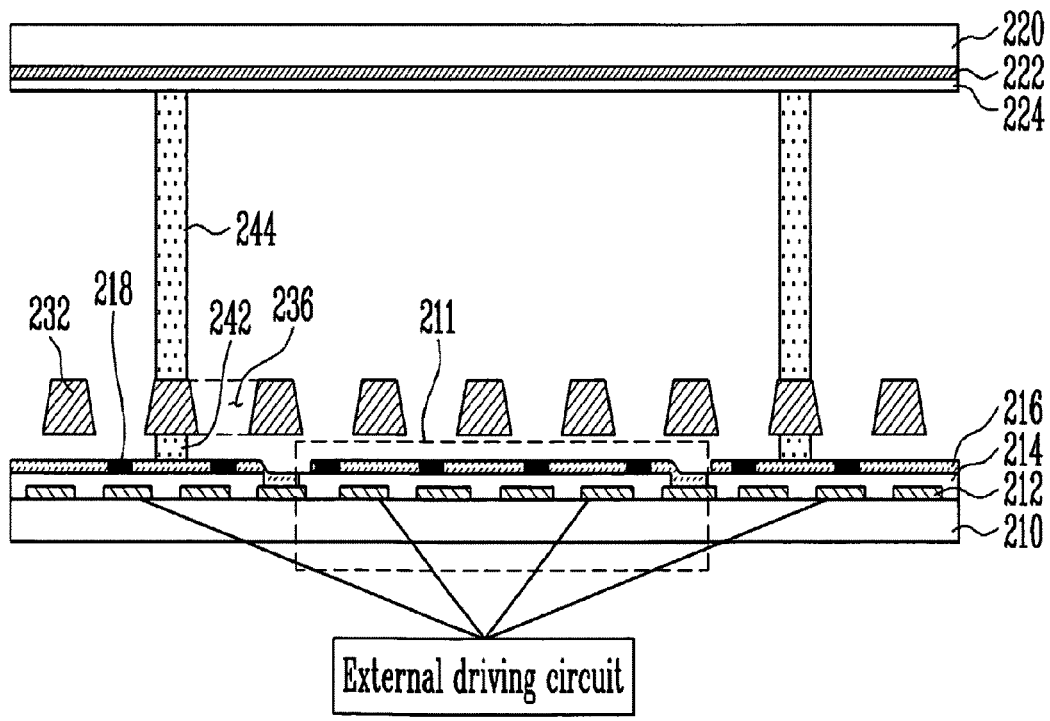
FIG. 2 is a front view of a field emission back light unit according to an exemplary embodiment of the present invention.

FIG. 2 illustrates a field emission back light unit according to an exemplary embodiment of the present invention.

Referring to FIG. 2, a field emission back light unit according to an exemplary embodiment of the present invention includes a lower substrate 210 as a cathode substrate, a plurality of data electrodes 212 formed on the lower substrate 210, an insulating layer 214 formed on the data electrode 212, a cathode electrode 216 formed on the insulating layer 214, a field emitter 218 formed on the cathode electrode 216, an upper substrate 220 as an anode substrate, an anode electrode 222 formed on the upper substrate 220, a phosphor layer 224 formed on the anode electrode 222, a metal gate substrate 232, and spacers 242 and 244.

The lower substrate 210 is spaced apart from and faces the upper substrate 220, and maintains a specific distance therebetween by the spacer 242 formed between the lower substrate 210 and the metal gate substrate 232, and the spacer 244 formed between the upper substrate 220 and the metal gate substrate 232. The lower substrate 210 and the upper substrate 220 may be glass substrates.

The plurality of data electrodes 212 are formed on the lower substrate 210, and spaced a specific distance apart from one another. The data electrode 212 may be formed of a transparent conductive material, which may be indium tin oxide (ITO), indium zinc oxide (IZO), indium tin zinc oxide (ITZO) or carbon nano tube (CNT). Here, the data electrode 212 is formed of a transparent conductive material to facilitate backside exposure using UV when forming the field emitter. However, when an opening the same as that in the cathode electrode, in which the field emitter is formed in the opening of the cathode electrode, is formed in the data electrode, an opaque electrode can be used as the data electrode.

The insulating layer 214 is formed on the data electrode 212, and includes exposure regions 215 exposing predetermined data electrodes 212.

The cathode electrodes 216 are formed on the insulating layer 214, and electrically connected with the data electrodes 212 through the exposure regions 215.

Meanwhile, among the cathode electrodes 216, a cathode block 211 is defined based on the cathode electrodes 216 electrically isolated from each other, and brightness of the cathode block 211 can be controlled according to current supplied through the data electrode 212.

The cathode electrode 216 may be formed of a conductive material capable of blocking light. This is to facilitate the backside exposure using UV when forming the field emitter.

At least one field emitter 218 is formed on the cathode electrode 216, and preferably, a plurality of field emitters 218 are formed to be spaced a specific distance apart from one another.

The field emitter 218 may be formed of an electron emission material having an excellent electron emission characteristic, which includes carbon nano tube, carbon nano fiber and a carbonaceous synthetic material.

The anode electrode 222 is formed on the upper substrate 220, and the phosphor layer 224 is coated on the anode electrode 222. The anode electrode 222 may also be formed of a transparent conductive material, such as ITO, IZO or ITZO.

The metal gate substrate 232 serves as a gate electrode inducing electron emission from the field emitter 218, and spaced a specific distance apart from the upper and lower substrates 220 and 210 by the spacers 242 and 244.

A plurality of openings 236 are formed in the metal gate substrate 232, wherein the opening 236 may be formed to correspond to a location of the field emitter 218.

The field emission back light unit capable of local dimming having the above-described structure according to the exemplary embodiment of the present invention controls the brightness of each of the cathode block 211 according to the change of current flowing through the data electrode 212. That is, one of the data electrodes 212 included in each cathode block 211 is used as an electrode interconnection for one cathode block, thereby facilitating connection of the electrode with an external driver.

As described above, the data electrode 212 and the insulating layer 214 of the field emission back light unit according to the exemplary embodiment of the present invention may be formed of a transparent material, and the cathode electrode 216 may be formed of a conductive material capable of blocking light. These are to facilitate the UV backside exposure when the field emitter is formed of an exposure paste using a carbonaceous material.

Figure 3:
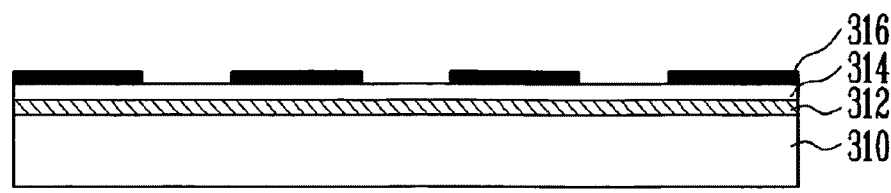
FIG. 3 illustrates UV backside exposure.
Figure 3:
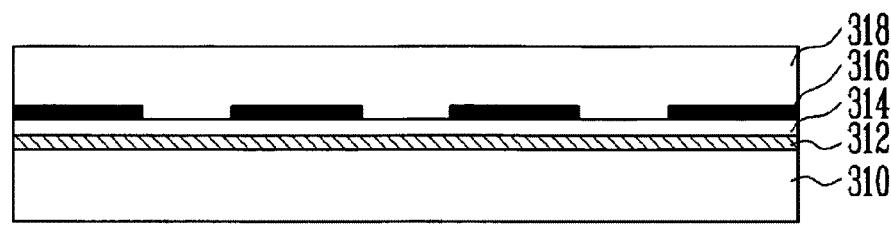
Figure 3:
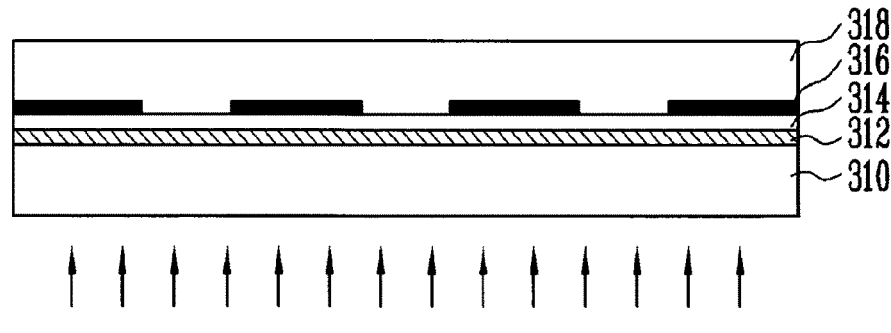
Figure 3:
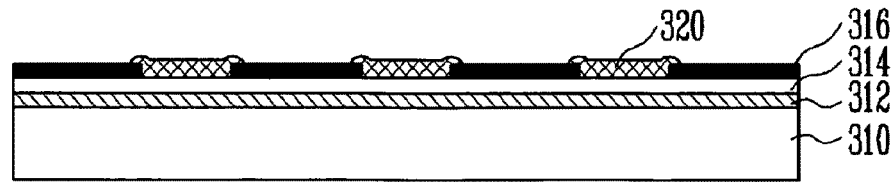

A method of fabricating a field emitter by UV backside exposure will be described with reference to FIG. 3.

First, as in FIG. 3(a), a data electrode 312 and an insulating layer 314 are formed on a transparent substrate 310, and a pattern 316 for forming a field emitter is formed on the insulating layer 314.

Here, the data electrode 312 and the insulating layer 314 are formed of a transparent material, and the pattern 316 for forming the field emitter is formed of an opaque conductive material.

Subsequently, as in FIG. 3(b), a carbonaceous material-negative exposure paste 318 is printed on the stacked structure by screen printing.

Then, a structure as in FIG. 3(d) is formed by drying the structure, irradiating UV light on a bottom surface of the substrate 310, and developing the structure as illustrated in FIG. 3(c).

That is, the exposure paste 318 is removed from a UV-blocked region by a pattern, and post-processes such as annealing and surface treatments are performed, thereby finally completing the field emitter 320. While most of the area of the field emitter formed as such is in contact with the insulating layer, an edge of the field emitter is in contact with a cathode electrode, and thus current required for field emission can be supplied to the emitter. When the field emitter is formed using the backside exposure, the field emitters are labeled to a uniform height, so that the field emitter having a uniform height and high reliability can be formed.

Figure 4:
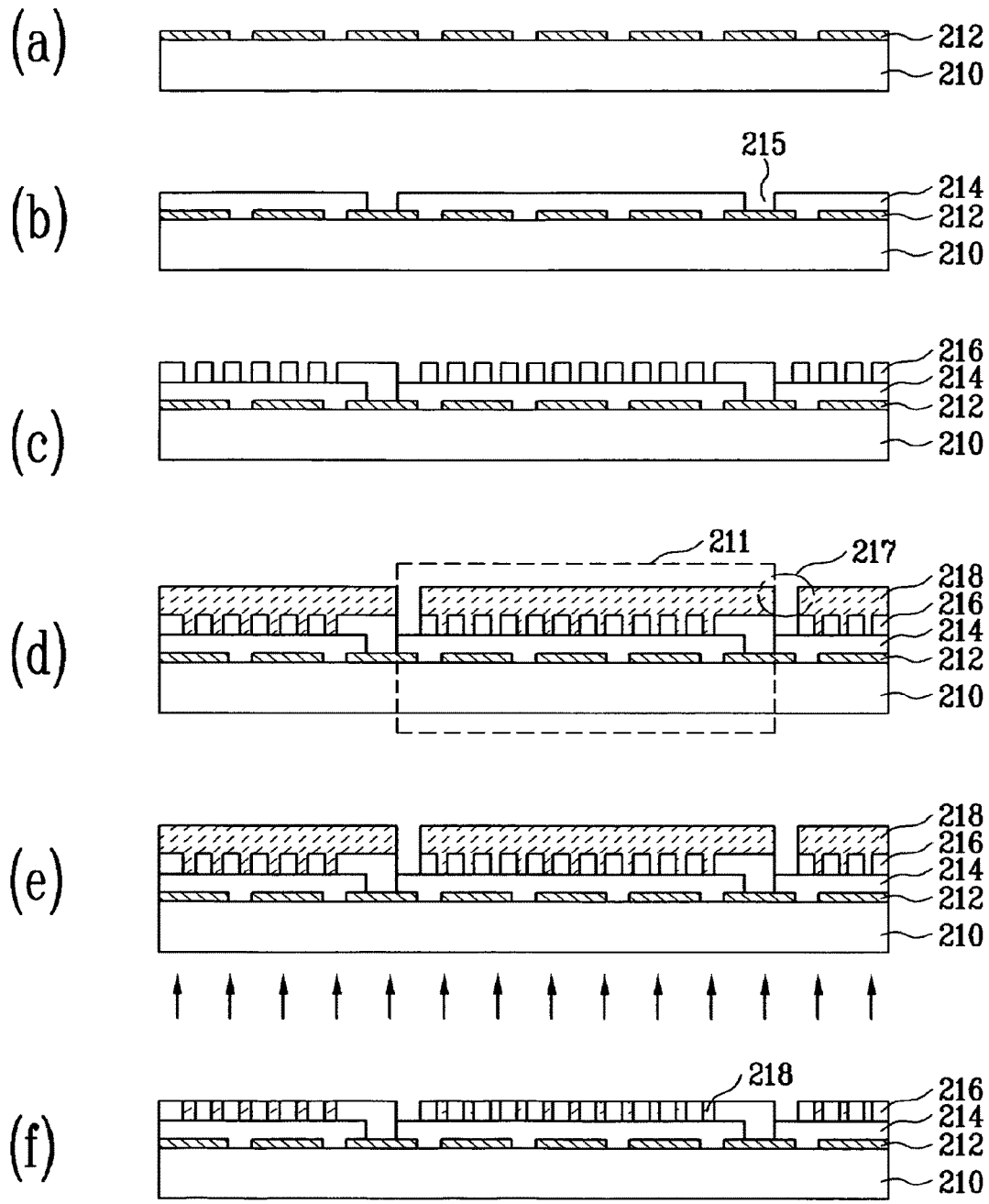
FIG. 4 illustrates a process of fabricating a cathode structure for a field emission back light unit by backside exposure according to an exemplary embodiment of the present invention.

FIG. 4 illustrates a process of fabricating a cathode substrate for a field emission back light unit using backside exposure according to the present invention.

First, as in FIG. 4(a), a data electrode 212 having a pattern is formed on a transparent substrate 210. Here, the data electrode 212 is formed of a transparent material.

After that, as in FIG. 4(b), an insulating layer 214 is formed on the data electrode 212. Here, the insulating layer 214 is formed of a transparent material, and has exposure regions 215 exposing the predetermined data electrodes 212 to form a cathode block 211.

Then, as in FIG. 4(c), a cathode electrode 216 is formed on the insulating layer 214. Here, the cathode electrode 216 is formed, considering a size and a distance of the cathode block 211. That is, it is preferable that a sufficient distance for electrical insulation between the cathode blocks 211 is maintained, and an interface between the blocks not be exposed during emission of a phosphor.

As in FIG. 4(d), an emitter paste 218 is applied to the structure except an isolation region 217 for electrically isolating the cathode blocks 211.

After the backside exposure by irradiating UV light on a bottom surface of the substrate and development as in FIG. 4(e), a cathode substrate is completed, in which the cathode blocks 211 are electrically isolated from one another as in FIG. 4(f).

The data and cathode electrodes, and the insulating layer may be easily formed by conventional deposition, and photolithography or screen printing.

Figure 5:
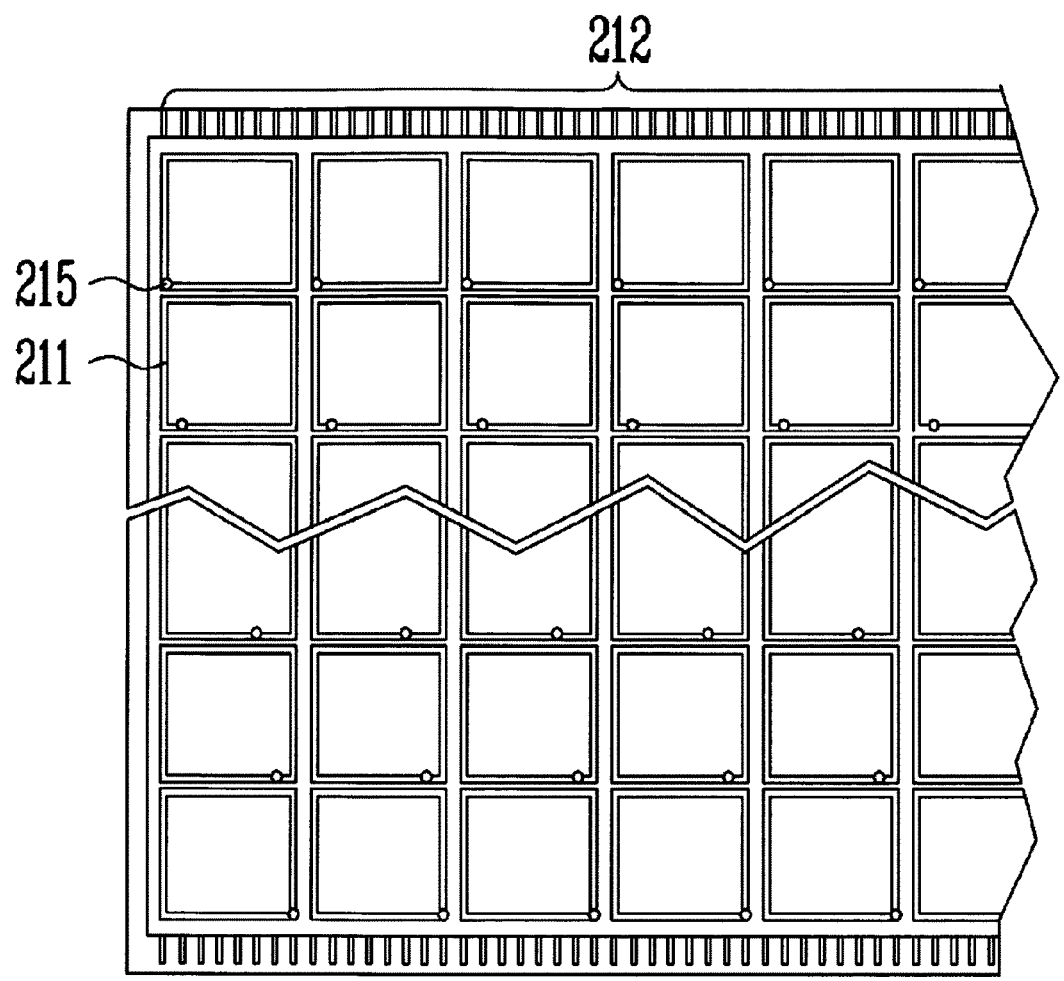
FIG. 5 is a plan view of a field emission back light unit according to an exemplary embodiment of the present invention.

FIG. 5 illustrates the cathode substrate completed by the above-described process.

Referring to FIG. 5, it can be seen that an exposure region 215 is formed on each cathode block 211, and as described above, the cathode electrodes 216 correspond to and are electrically connected with the data electrodes 212 one by one through the exposure regions 215. When current is applied to any one of the data electrodes 212, the current flows into only one cathode electrode 216, and thus the brightness can be controlled by cathode blocks 211 in the cathode substrate formed as such. Further, it can be seen that an interconnection between the cathode block 211 and an electrode is formed very simply by the data electrode 212 and the insulating layer included in the present invention.

Figure 6:
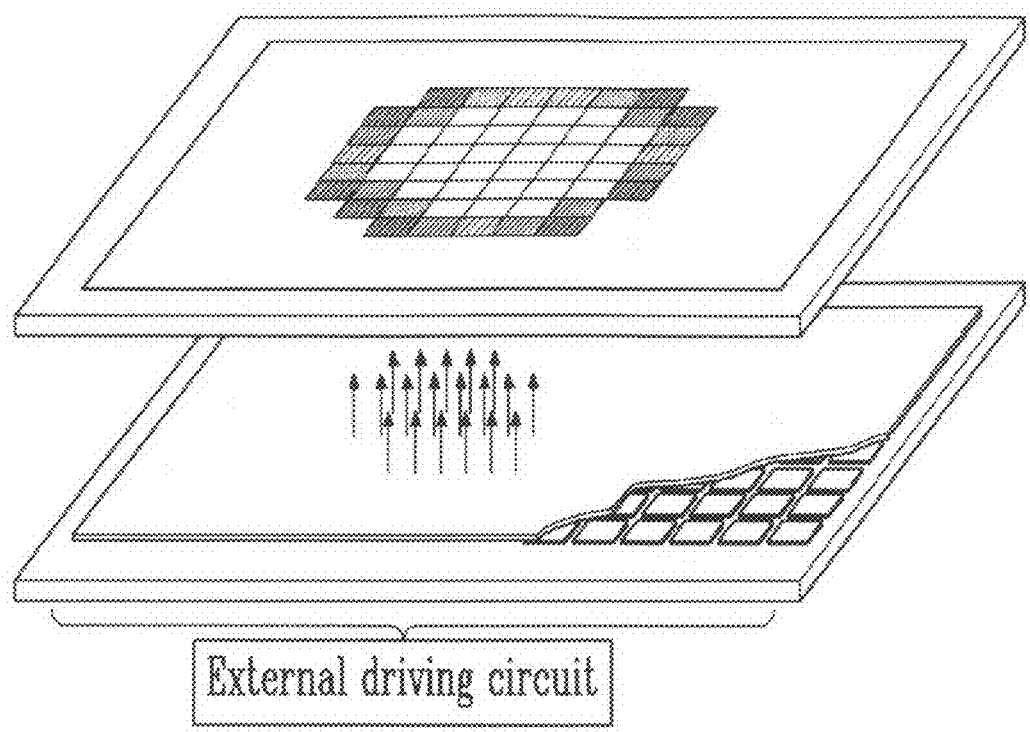
FIG. 6 illustrates a local dimming state exhibited by the field emission back light unit according to an exemplary embodiment of the present invention.

FIG. 6 illustrates a local dimming state exhibited by a field emission back light unit according to the present invention. During the local dimming, voltage applied to a metal gate substrate and an anode electrode is fixed, and an amount of current flowing through a cathode electrode and a data electrode, which are electrically connected with a specific field emitter, is controlled, thereby controlling an amount of electron beam emitted from the field emitter, so that a gray scale of a specific part can be expressed.

Here, the amount of current may be controlled by a semiconductor switching circuit such as a TFT or a MOSFET, and an amount of electrons flowing into the emitter may be controlled from the cathode electrode, which is isolated in pulse width modulation (PWM) or pulse amplitude modulation (PAM).

Figure 7:
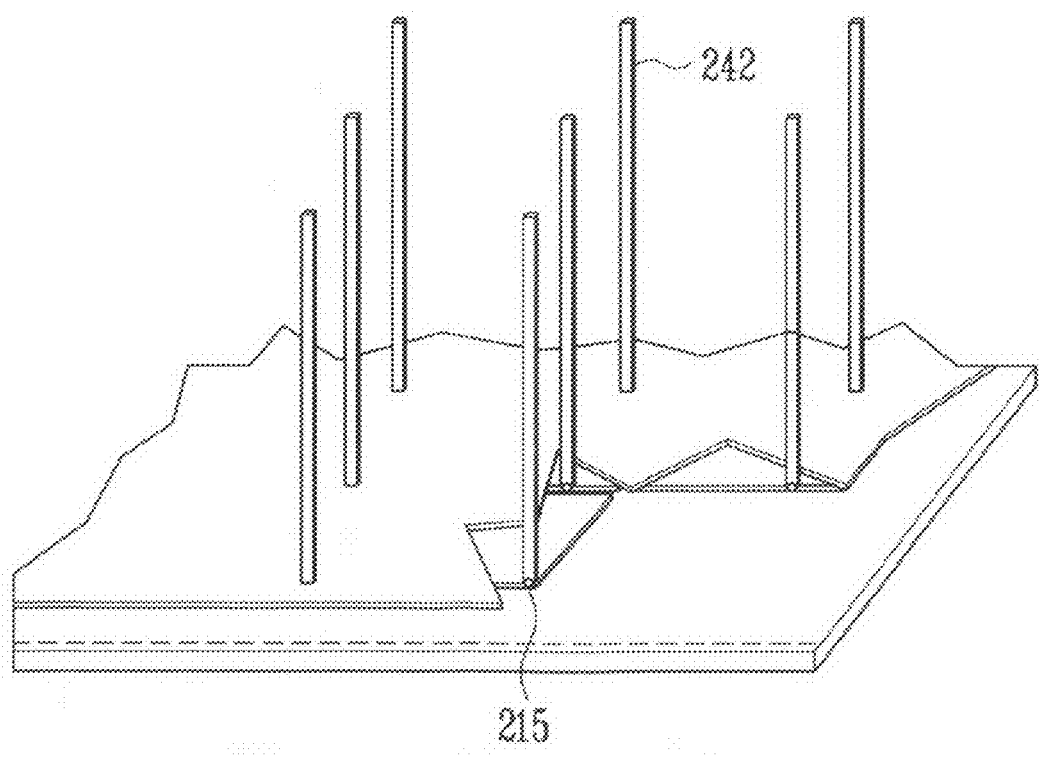
FIG. 7 illustrates a location of a spacer according to an exemplary embodiment of the present invention.

Meanwhile, as in FIG. 7, when a spacer 242 is formed at a location of a hole, the field emitter is not formed, so that a non-emission region can be minimized.

As described above, interconnections connected with an external electrode may be simply formed by a dual structure of a data electrode and an insulating layer.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A cathode structure for a field emission back light unit, comprising:
   a plurality of data electrodes formed on a cathode substrate and spaced apart from one another;
   an insulating layer formed on the data electrodes, and having exposure regions exposing the predetermined data electrodes;
   cathode electrodes formed on the insulating layer and electrically connected with the data electrodes through the exposure regions; and
   at least one field emitter formed on the cathode electrode and being in contact with the cathode electrode,
   wherein a cathode block is defined based on the cathode electrodes electrically isolated from one another, and brightness of each cathode block is controlled according to current supplied through the data electrode.

2. The cathode structure according to claim 1, wherein the data electrode is formed of a transparent conductive material.

3. The cathode structure according to claim 2, wherein the transparent conductive material is any one of the ITO, IZO, ITZO and CNT.

4. The cathode structure according to claim 1, wherein an isolation region in which the cathode electrode is not formed on the insulating layer is formed to electrically isolate the adjacent cathode blocks from one another.

5. The cathode structure according to claim 1, wherein the cathode electrode is formed of a conductive material capable of blocking light.

6. The cathode structure according to claim 1, wherein the field emitter is formed of any one of carbon nano tube, carbon nano fiber and a carbonaceous synthetic material.

7. A method of fabricating a cathode structure for a field emission back light unit, comprising:
defining cathode blocks for controlling brightness by blocks on a transparent substrate;
forming a plurality of data electrodes spaced apart from one another on the respective cathode blocks;
forming an insulating layer having an exposure region exposing any one of the data electrodes formed on the respective cathode blocks;
forming a plurality of cathode electrodes spaced apart from one another on the insulating layer, any one of the cathode electrodes being electrically connected with the data electrode through the exposure region;
applying an emitter paste to the cathode electrode except a part of the insulating layer, in which the cathode electrode is not formed, the emitter paste being in contact with the cathode electrode; and
irradiating UV light on a bottom surface of the substrate and developing the substrate.

8. A field emission back light unit, comprising:
an upper substrate and a lower substrate, which are spaced apart from and face each other;
an anode electrode and a phosphor layer, which are formed on the upper substrate;
a metal gate substrate disposed between the upper and lower substrates to induce electron emission from a field emitter, and having an opening to pass the emitted electron therethrough;
a plurality of data electrodes spaced apart from one another on the lower substrate; an insulating layer formed on the data electrodes and having exposure regions exposing the predetermined data electrodes;
cathode electrodes formed on the insulating layer and electrically connected with the data electrodes through the exposure regions; and
at least one field emitter formed on the cathode electrode and being in contact with the cathode electrode,
wherein a cathode block is defined based on the cathode electrodes electrically isolated from one another, and brightness of the cathode block is controlled according to current supplied through the data electrode.

9. The field emission back light unit according to claim 8, further comprising: insulating spacers formed between the lower substrate and the metal gate substrate, and the upper substrate and the metal gate substrate, respectively.

10. The field emission back light unit according to claim 9, wherein the insulating spacer is formed on the exposure region.

* * * * *